United States Patent [19]

Abolins et al.

[11] 3,936,651

[45] Feb. 3, 1976

[54] TURBOSET INCLUDING A HELIUM TURBINE AND A HELIUM-COOLED GENERATOR

[75] Inventors: Arnold Abolins, Mulheim (Ruhr); Hermann Finckh, Boxdorf; Dietrich Lambrecht, Mulheim (Ruhr); Martin Trabler, Erlangen, all of Germany

[73] Assignee: Kraftwerk Union Aktiengesellschaft, Mulheim (Ruhr), Germany

[22] Filed: Jan. 15, 1974

[21] Appl. No.: 433,520

[30] Foreign Application Priority Data

Jan. 18, 1973 Germany............................ 2302456

[52] U.S. Cl................................. 290/1 R; 60/671
[51] Int. Cl. ............................................ H02p 9/04
[58] Field of Search ............ 60/651, 657, 658, 671, 60/689; 290/1; 310/52, 55, 58, 64

[56] References Cited

UNITED STATES PATENTS

| 579,051 | 3/1897 | Fiske.................................... 310/52 |
| 1,987,456 | 1/1935 | Woodward......................... 310/58 X |
| 2,210,692 | 8/1940 | Stokes.................................... 310/58 |
| 2,495,745 | 1/1950 | Litton .............................. 60/671 X |
| 2,961,549 | 11/1960 | Shipitalo............................. 290/1 A |
| 3,531,668 | 9/1970 | Cathey................................ 310/58 |

*Primary Examiner*—Martin P. Schwadron
*Assistant Examiner*—H. Burks, Sr.
*Attorney, Agent, or Firm*—Herbert L. Lerner

[57] ABSTRACT

A turboset located in an engine room containing a helium atmosphere under overpressure includes a generator cooled by helium which is introduced therein through openings formed in the generator housing and flows through a connecting line to a location of the helium circulatory loop that has a gas pressure lower than the internal gas pressure of the chamber.

7 Claims, 1 Drawing Figure

U.S. Patent    February 3, 1976    3,936,651
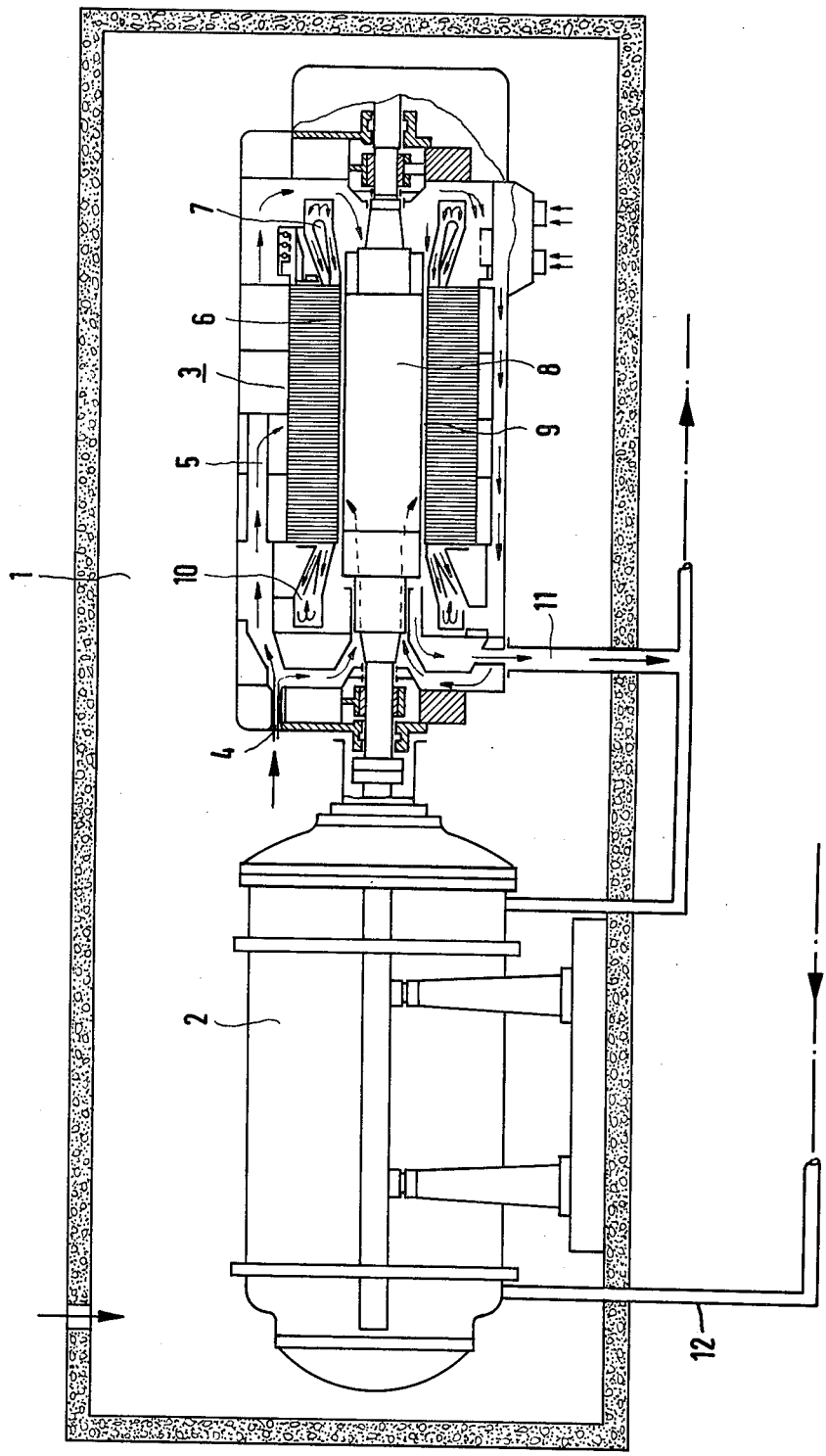

TURBOSET INCLUDING A HELIUM TURBINE AND A HELIUM-COOLED GENERATOR

The invention relates to a turboset which includes a helium turbine and a helium-cooled generator.

For utilizing heat from nuclear reactors, it has been known heretofore to employ turbines operating with helium in a closed circulatory loop. The rare or noble gas, helium, is thus compressed in the compressor of the gas turbine to about 60 bar and subsequently decompressed in the helium circulatory loop to about 20 bar.

Because of the relatively small size of helium molecules, sealing problems are particularly difficult to resolve in such helium circulatory loops. The demand for optimum tightness of flange connections generally necessitates additional lip welding, which must be opened up whenever the turbine requires inspection.

Independently of this, it is an object of the invention to provide a turboset wherein sealing problems have been eliminated. The helium turbine of the invention is disposed in a closed room which is filled with a helium atmosphere. Leaks at isolated locations of the turbine can be tolerated, since there is accordingly no danger of intermixing helium with air.

It is another object of the invention to provide the turbine, which is mounted in a closed room containing a helium atmosphere, with a generator that is coupled with the turbine and is of such construction that no sealing problems are associated therewith, and trouble-free cooling of the generator is assured.

With the foregoing and other objects in view, there is provided, in accordance with the invention, turboset comprising an engine room filled with helium, a helium turbine mounted in the engine room, and a generator connected to the helium turbine in the engine room, the generator having means defining at least one opening exposing the interior thereof to the helium in the engine room so as to be cooled thereby, and means connecting the interior of the generator to a location in a circulatory loop of helium whereat the helium pressure is lower than the helium pressure in the engine room.

In accordance with another feature of the invention, the generator has a generator shaft, and the means defining at least one opening exposing the interior of the generator to the helium in the engine room comprises an annular chamber surrounding the generator shaft.

In accordance with a further feature of the invention, the helium in the engine room wherein the turbine is mounted is at overpressure.

In accordance with an additional feature of the invention, the pressure of the helium in the machine room corresponds substantially to the highest pressure prevailing in the circulatory loop of helium.

In accordance with an added feature of the invention, the helium circulatory loop includes the helium turbine, the generator being connected by the connecting means to the helium circulatory loop of the helium turbine.

In accordance with yet another feature of the invention, there are provided means affording communication between the interior of the helium turbine and the engine room for maintaining the pressure in the engine room.

In accordance with a concomitant feature of the invention, the generator comprises a stator and a rotor spaced from and rotatable relative to one another, and annular channel means communicating with the space between the stator and the rotor, the means connecting the interior of the generator to the location in the helium circulatory loop being connected to the space between the stator and the rotor.

Other features which are considered as characteristic for the invention are set forth in the appended claims.

Although the invention is illustrated and described herein as embodied in tuboset including a helium turbine and a helium-cooled generator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing which is a diagrammatic elevational view, partly in section, of the tuboset constructed in accordance with the invention.

Referring now to the drawing, there is shown therein the turboset of the invention which includes a helium turbine 2 and a generator 3 coupled therewith and suitably mounted in a machine or engine room 1 filled with a helium atmosphere. The generator 3 has openings 4 at the circumference of an end face of the generator, of which one can be seen in the drawing. The helium gas in the machine or engine room 1 flows into the generator 3 through these openings, which are constructed as throttles, depending upon the pressure difference between the environment i.e. the atmosphere in the engine or machine room 1, and the interior of the generator 3, and additionally through optional annular spaces formed at the seals of the generator shaft. The helium is conducted through cooling gas channels 5 which pass the helium initially through the stator 6 of the generator 3 and then, through an annular channel 7, through the rotor 8 of the generator and a space 9 located between the rotor 8 and the stator 6 to another annular channel 10, and from the latter to a connecting line 11, which leads to a location of a helium circulatory loop wherein the pressure is lower than the pressure of the helium in the machine or engine room 1.

The supply and discharge system of the helium to the helium turbine 2 is shown diagrammatically at 12 in the drawing. In the event the helium circulatory loop 12 of the helium turbine 2 contains no radioactive or other impurities, a separate helium loop for the machine room 1 is unnecessary. An opening would then be provided, advantageously, in the housing of the helium turbine at a location thereof at which the compressed helium gas is present at as low a temperature as possible. In such a case, the overpressure in the machine or engine room 1 would correspond to the highest pressure in the helium circulatory loop 12 of the helium turbine 2. Such a construction has the advantage that the helium gas heated outside the machine or engine room 1, such as in a nuclear reactor, for example, exhibits within the helium turbine virtually no difference in pressure from that of the ambient helium atmosphere in the machine or engine room 1. The helium gas is subsequently decompressed in a conventional manner with the helium turbine 2 to a low pressure value, and is cooled in the process. With this construction, only the cold parts of the housing of the helium turbine 2 are required to withstand a pressure difference, a fact which has an advantageous effect on the construction or design of the helium turbine 2.

Upon flowing into the generator 3, the helium is decompressed therein from the relatively high pressure prevailing in the machine or engine room 1 to a relatively low pressure value. In the illustrated embodiment of the invention, the space between the stator 6 and the rotor 8 of the generator 3 immediately precedes or is upstream of the connecting line 11, as seen in the direction of the helium flow within the generator 3, so that a relatively low gas pressure prevails in the space 9. This results in lower friction losses than in a cooling circulatory loop having a flow direction different from the one in the illustrated embodiment of the invention.

We claim:

1. Turboset comprising an engine room filled with helium, a helium turbine mounted in said engine room, and a generator connected to said helium turbine in said engine room, said generator having means defining at least one opening exposing the interior thereof to the helium in said engine room so as to be cooled thereby, and means connecting the interior of said generator to a supply of helium outside said engine room having a helium pressure lower than the helium pressure in said engine room.

2. Turboset according to claim 1 wherein said generator has a generator shaft, and said means defining at least one opening comprises an annular chamber surrounding said generator shaft.

3. Turboset according to claim 1 wherein the helium in said engine room is at overpressure.

4. Turboset according to claim 1 wherein the pressure of the helium in said engine room corresponds substantially to the highest pressure prevailing in the circulatory loop of helium.

5. Turboset according to claim 1 wherein the helium circulatory loop includes the helium turbine, said generator being connected by said connecting means to the helium circulatory loop of the helium turbine.

6. Turboset according to claim 3 including means affording communication between the interior of said helium turbine and said engine room for maintaining the pressure in said engine room.

7. Turboset according to claim 1 wherein said generator comprises a stator and a rotor spaced from and rotatable relative to one another, and annular channel means communicating with the space between said stator and said rotor, said means connecting the interior of said generator to said location in said helium circulatory loop being connected to said space between said stator and said rotor.

* * * * *